(12) United States Patent
Yu et al.

(10) Patent No.: US 9,194,687 B1
(45) Date of Patent: Nov. 24, 2015

(54) SYSTEM AND METHOD FOR MEASURING NON-CONDUCTIVE COATING THICKNESS USING EDDY CURRENTS

(75) Inventors: Feng Yu, Charlotte, NC (US); Jay M. Amos, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 879 days.

(21) Appl. No.: 13/018,562

(22) Filed: Feb. 1, 2011

Related U.S. Application Data

(60) Provisional application No. 61/301,489, filed on Feb. 4, 2010.

(51) Int. Cl.
*G01B 7/06* (2006.01)

(52) U.S. Cl.
CPC ........ *G01B 7/105* (2013.01); *G01B 7/06* (2013.01); *G01B 7/10* (2013.01)

(58) Field of Classification Search
CPC .......... G01B 7/105; G01B 21/08; G01B 7/06; G01B 7/085; G01B 11/0616; G01B 15/02; G01B 17/025; G01B 7/10
USPC .................................................. 324/228–231
See application file for complete search history.

(56) References Cited

U.S. PATENT DOCUMENTS

| | | | |
|---|---|---|---|
| 3,922,599 A * | 11/1975 | Steingroever et al. | 324/230 |
| 3,986,105 A * | 10/1976 | Nix et al. | 324/230 |
| 4,675,605 A | 6/1987 | Watjen | 324/240 |
| 4,755,753 A * | 7/1988 | Chern | 324/237 |
| 5,017,869 A | 5/1991 | Oliver | |
| 5,343,146 A | 8/1994 | Koch et al. | |
| 5,416,411 A * | 5/1995 | Elsmore | 324/230 |
| 5,453,689 A * | 9/1995 | Goldfine et al. | 324/239 |
| 5,467,014 A | 11/1995 | Nix | |
| 5,525,903 A | 6/1996 | Mandl et al. | |
| RE35,703 E | 12/1997 | Koch et al. | |
| 5,793,206 A * | 8/1998 | Goldfine et al. | 324/242 |
| 6,040,694 A * | 3/2000 | Becker | 324/230 |
| 6,479,990 B2 | 11/2002 | Mednikov et al. | |
| 6,670,808 B2 | 12/2003 | Nath et al. | |
| 6,700,370 B2 * | 3/2004 | Chen et al. | 324/230 |
| 6,777,930 B2 | 8/2004 | Fischer | |
| 6,977,498 B2 | 12/2005 | Scherzinger et al. | |
| 7,074,109 B1 | 7/2006 | Bennett et al. | |

(Continued)

FOREIGN PATENT DOCUMENTS

WO    WO 01/46684 A1 *  6/2001

*Primary Examiner* — Jay Patidar
(74) *Attorney, Agent, or Firm* — Lathrop & Gage LLP

(57) ABSTRACT

A nondestructive system and method for measuring non-conductive coating thickness is disclosed. The method includes providing a composite substrate, placing a conductive layer over a surface of the composite substrate, and depositing a plurality of non-conductive coating layers over the conductive layer. An eddy-current measuring coil formed on a printed circuit board is provided atop the coating layers. The coil has a driving trace with first and second driving electrodes, and a receiving trace having first and second receiving electrodes. The receiving and driving traces can be either coaxial or interwoven, are spaced apart, and share a common center. A load administered to the first and second driving electrodes using an eddyscope is measured across the first and second receiving electrodes to determine impedance; the measured impedance is used to determine a total thickness of the plurality of coating layers and whether an overall coating thickness is uniform.

7 Claims, 3 Drawing Sheets

(56) References Cited

U.S. PATENT DOCUMENTS

| | | |
|---|---|---|
| 7,952,348 B2 * | 5/2011 | Sun et al. .................. 324/240 |
| 2004/0104725 A1 | 6/2004 | Sergoyan et al. |
| 2004/0138838 A1 * | 7/2004 | Scheiner et al. ............ 702/64 |
| 2005/0046874 A1 * | 3/2005 | Caton et al. ................ 356/630 |
| 2005/0173259 A1 | 8/2005 | Mavliev et al. |
| 2008/0079425 A1 | 4/2008 | Fuente Souviron et al. |
| 2009/0033323 A1 * | 2/2009 | Georgeson et al. ........... 324/228 |
| 2009/0251137 A1 * | 10/2009 | Daalmans et al. ............ 324/230 |
| 2009/0256558 A1 | 10/2009 | Fujita et al. |
| 2012/0088438 A1 * | 4/2012 | Tada et al. ................. 451/5 |

\* cited by examiner

SYSTEM AND METHOD FOR MEASURING NON-CONDUCTIVE COATING THICKNESS USING EDDY CURRENTS

CROSS-REFERENCE TO RELATED APPLICATIONS

This application claims the benefit of U.S. Provisional Application No. 61/301,489 filed Feb. 4, 2010.

BACKGROUND OF THE INVENTION

1. Field of the Invention

The invention relates generally to methods of measuring coating thicknesses. More specifically, the invention relates to the field of using eddy current measurements to make the nondestructive thickness determination.

2. Description of the Related Art

Unlike metals, composite materials are easily damaged in the event of lightning strike, since most of them are either nonconductive (e.g., fiberglass), or low in conductivity (e.g., carbon), which do not allow the energy to follow easily from the impact to some point of dissipation. As a result, a lightning strike can cause detrimental effects in composite materials and structures, such as airframe, turbine engine components and wind turbines. Structural damage can include overheating, vaporization of resin or possible burn-through the laminate, as well as aircraft electrical system malfunction or permanent damage due to electromagnetic field interference.

It is common practice to bond conductive mesh or foil made of high-conductivity metals (Al, Cu, Ni-coated, etc.) to the composite structure as the outside ply to be used as current exit routes to discharge lightning quickly. An example of a mesh-equipped composite skin after lightning strike can be seen in FIG. 1. A multilayer coating system (e.g., surfacer, primer, and topcoat) is applied to composite materials above this conductive layer to improve surface properties, including appearance, adhesion, wear resistance, moisture protection, etc. This multilayer coating system is a critical part of the quality assurance and cost control process. In particular, the applied coating thickness must be controlled in certain range to achieve the required lighting strike protection. In other words, there is a need to conduct accurate non-conductive coating thickness measurement in composite from the point of view of lighting strike protection and flight safety.

Various techniques have been used in the industry to measure thickness of this multilayer coating system on conductive mesh/foil substrates in composite materials, including capacitive, microwave and ultrasonics. For example, ultrasonic testing (UT) has been extensively used to measure the thickness of the coating on composite material by exploiting its high sensitivity to acoustic impedance difference between the coating system and it's underlying composite substrate. However, this excellent sensitivity also causes difficulty in signal interpretation as each coating interface (e.g., surfacer/substrate, surfacer/primer, etc.) generates an ultrasonic signal. Consequently, special training, certification and extensive UT experience is needed for operators to interpret the UT signal for coating thickness measurement, which in turn increases inspection cost and time. The difficulty in interpreting the complicated ultrasonic reflections can potentially lead to coating thickness measurement error and insufficient lightning protection. Further, UT technique is difficult to be deployed in production and field because of the need to use couplant to transmit UT into the part.

SUMMARY

The disclosed embodiments include methods and systems. One embodiment is a method of measuring coating thicknesses for defects. This embodiment includes the steps of (i) providing a composite substrate; (ii) including a conductive layer over a surface of the composite substrate; (iii) depositing a plurality of coating layers over the conductive layer; (iv) providing an eddy-current measuring coil formed on a printed circuit board (PCB), the coil having a driving spiral trace having first and second driving electrodes and a receiving spiral trace having first and second receiving electrodes, the receiving and driving spiral traces being either coaxial or interwoven, spaced apart, and sharing a common center; (v) administering a load to the first and second driving electrodes using an eddyscope; (vi) measuring the load across the first and second receiving electrodes to determine impedance; and (vii) using the impedance measured to determine a total thickness for the plurality of coating layers and whether an overall coating thickness is uniform.

A system embodiment includes means for measuring the collective thickness of a coating on a composite material, the coating comprising of a first layer having a first composition and a second layer made of a second composition which is different from the first composition. The system of this embodiment includes (i) an eddyscope; and (ii) a PCB mounted eddy-current coil probe electrically connected to the eddyscope. The coil probe is mountable above the first and second coating layers and causes a reading on the eddyscope which is directly related to overall thickness between the coil and a metallic lightning strike discharge layer; the coil probe also has a driving spiral trace having first and second driving electrodes and a receiving spiral trace having first and second receiving electrodes

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and a method for measuring coating thicknesses on composites or other nonconductive materials. It is well known that eddy current techniques have been applied to measure the thickness of nonconductive coatings on conductive materials, or conductive coatings on different conductive substrates. Basic Eddy Current Testing involves the use of a coil above a metal surface. When AC current flows in a coil in close proximity to a conducting surface the magnetic field of the coil will induce circulating (eddy) currents in that metal surface. The magnitude and phase of the eddy currents impact the loading on the coil, and thus, the impedance. The further the distance from the coil to the metal surface, the less is the eddy current flow. This decreases the loading on the coil which increases the effective impedance.

Eddy current methods have not historically been seen as beneficial in the determination of thicknesses of multilayer coatings on composites, however, because it is very difficult to generate eddy currents in composite materials, which are either extremely low-conductive or nonconductive.

Figure 1:
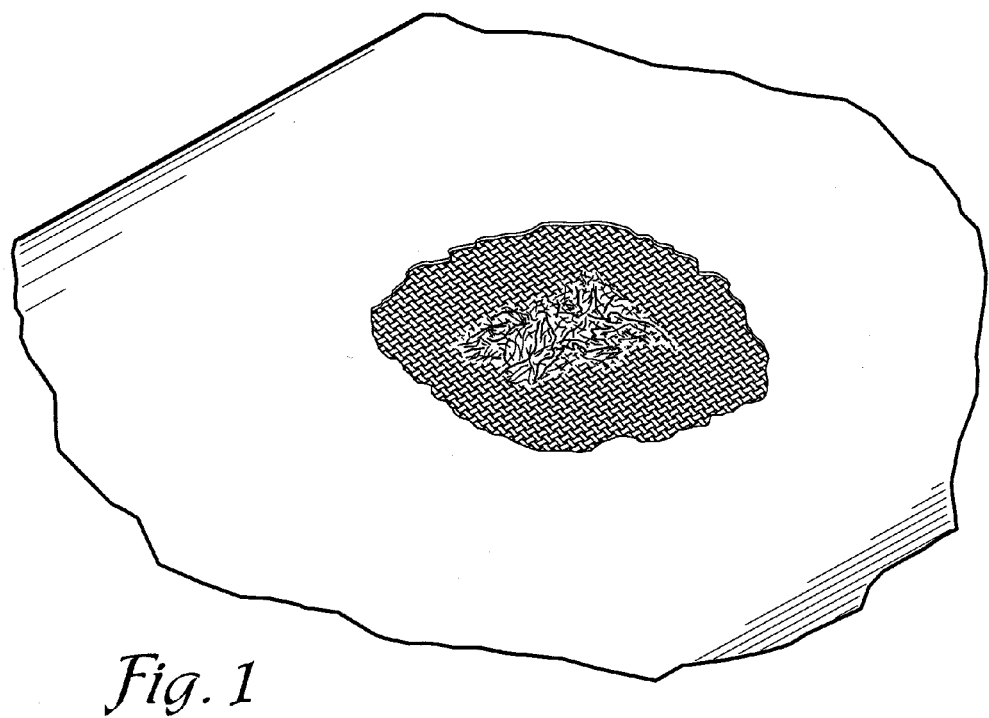
FIG. 1 shows an example of lightning strike damage to composite panel.
Figure 2:
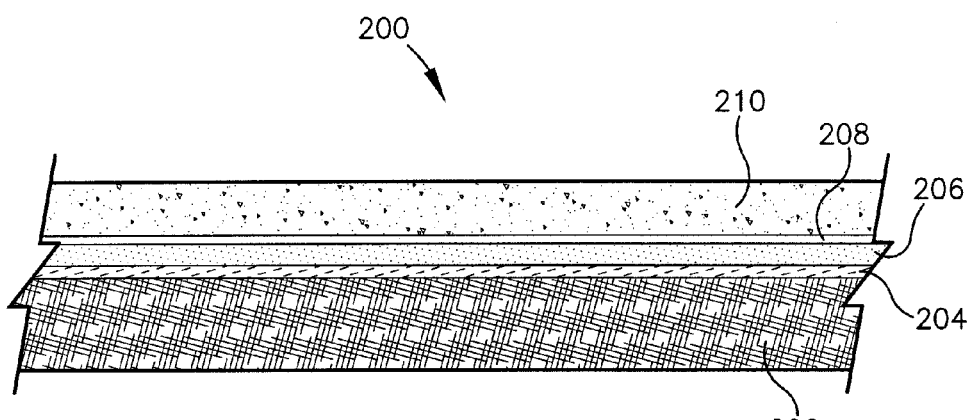
FIG. 2 shows a schematic of typical cross section cut of a multilayer-coating system on the composite panel with conductive mesh/foil.

An example section taken of a composite part can be seen in FIG. 2. Referring to the figure, it can be seen that the structure 200 includes a composite substrate 202, and typically a lightning strike mesh or foil 204, a surfacer layer 206, a prime coat 208, and a top coat 210. Disclosed embodiments will engage in the measurement of the thickness between mesh layer 204 and the collective coating thickness of layers 206, 208, and 210 so that thickness discrepancies can be identified and eliminated.

It has been discovered that eddy currents can be used to measure thicknesses variations in these coatings on composites or other similar nonconductive materials (e.g., carbon fiber, fiberglass) by exploiting the high-conductive mesh/foil embedded into the fabricated composite materials, with optimized coil configurations and frequencies. This conductive mesh or foil is often incorporated into critical structural products for lighting protection on aircraft, spacecraft, wind turbine blades, etc.

Figure 3:
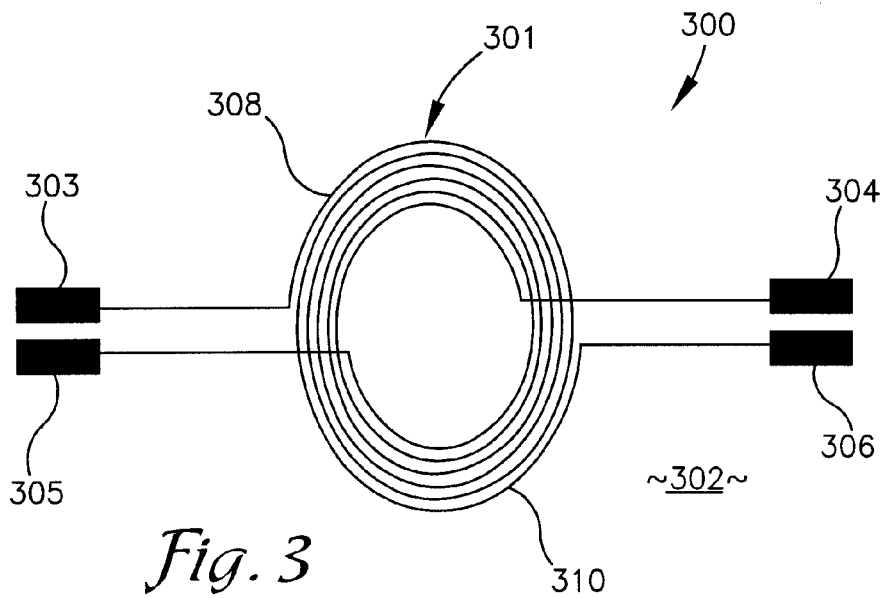
FIG. 3 shows an example of PCB eddy current coil associated with this invention.
Figure 4:
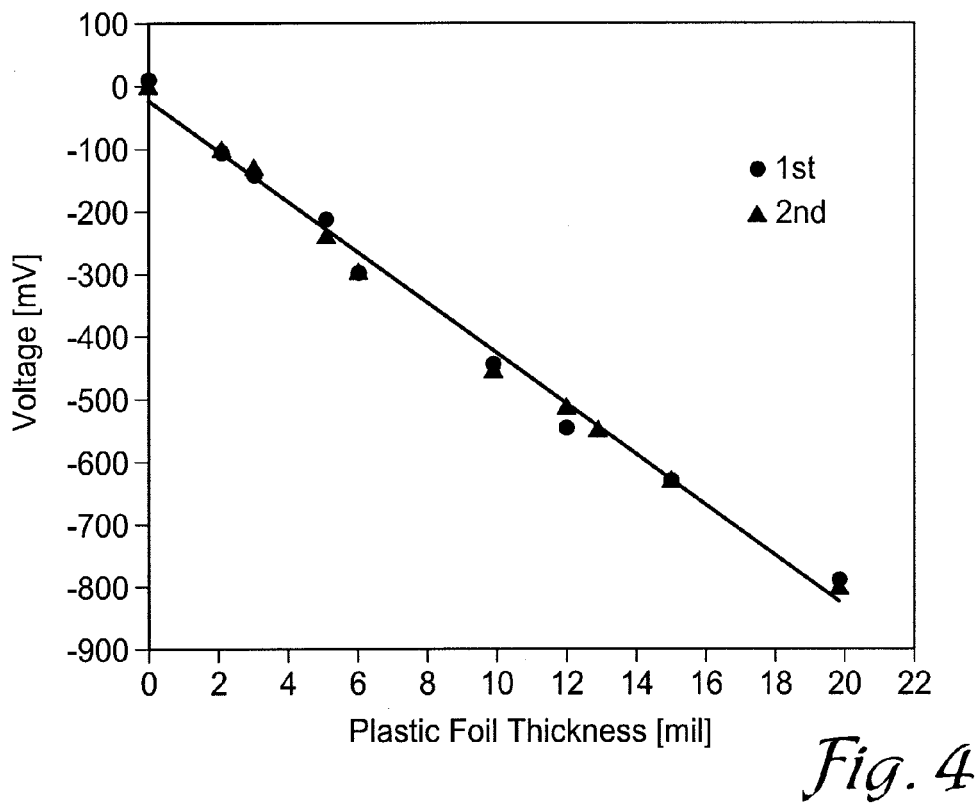
FIG. 4 shows the measured coil impedance values as a function of nominal thicknesses of plastic foils placed between the coil and composite to simulate a non-conductive coating during a $1^{st}$ and $2^{nd}$ repeat test.

In one embodiment, a device 300 shown in FIG. 3 is used to take the measurements. Device 300 includes an eddy current coil 301 fabricated into a printed circuit board (PCB) 302, with a primary driver coil connected to a function generator or eddy current instrumentation via electrodes 303 and 305 and a secondary receiver coil connected to a detector or eddy current instrumentation across electrodes 304 and 306 and receives electrical potential across electrodes 304 and 306. The PCB coil 301 can then be used to conduct coating thickness measurements by measuring impedance upon excitation of the coil at a selected frequency. In embodiments, the device electrically connected to and used to support the probe is an eddyscope (not shown). The eddyscope monitors the magnetic field strength generated by the eddy currents created. More specifically, the eddyscope will be used to calibrate by (i) use the test lift-off data relating to two different thickness plastic foils above a composite panel with conductive mesh/foil at the exterior surface, (ii) show the measured coil impedance values as a function of nominal thicknesses of plastic foils placed between the coil and composite panel; and (iii) compare differences between measured thickness using a two-point calibration function and nominal thickness of plastic foils. Once calibrated, the device will be used to display readings used to determine anomalies in the coating thicknesses deposited on an actual part The coil-supporting PCB can be made of a rigid material, e.g., a phenol, epoxy and the like, or of a flexible type of PCB fabrication material such as polyimide. For the embodiments in which the PCB substrate onto which the coils are fabricated is flexible, advantages for applications are realized. For example, the flexibility will enable the mounted coil to flex and measure coating thicknesses where parts have complex contours. Because many of the outer aircraft skin contours have tight curvature, the use of a flexible PCB material allows the PCB coil to conform to the shape of these irregularly shaped exterior portions of the aircraft to determine paint coating thicknesses.

The topology of this PCB eddy current coil can take different forms. For example, in some embodiments the coils can be spiral, rectangular, or formed into other shapes depending on the size and depth characteristics of the desired induced field. Further the coil configuration can be absolute, absolute differential, reflective-mode, or of the reflection-differential type. It should also be noted that the two-dimensional planar representation of the PCB coil is only representative, and the actual device may be physically arranged differently. For example, the receiving electrodes 304 and 306 and driving electrodes 303 and 305 shown in FIG. 3 as extending outward in the same plane as the coil 301 could actually be bent upward for ease in use of the device or configured otherwise for packaging. Further, the coil and electrodes could be included in a plastic housing in order to protect the PCB and coil to ensure reliable operation.

In the embodiment shown in FIG. 3, the coil is formed by a first driving trace 308 which is electrically connected to driving electrodes 303 and 305, and a second trace 310 which is electrically connected to receiving electrodes 304 and 306. These two sensors may be interlaced with each other, or wound coaxially as an inner and outer coil. Load, and thus impedance, can be measured across electrodes 304 and 306. The coil traces can have the following dimensions. The coil traces, in embodiments, could have thicknesses within the range of 0.002" to 0.02". More specifically, the range of trace thicknesses would fall between 0.002" and 0.004". In the preferred embodiment, the traces have a thickness of 0.004". With respect to the spacing between the traces (the gap between the first and second trace winds), in embodiments, each trace would be spaced at a distance from the other by between 0.002" and 0.01". In a specific embodiment, the range would fall between 0.003" and 0.005". In a preferred embodiment, the traces would be spaced apart from each other about 0.004". Another dimension of the coil is its overall diameter. This diameter in some embodiments would fall in the range from 0.3" to 1.5". In a more specific embodiment, the range would be from 0.4" to 0.7". In a preferred embodiment, the coil would have a diameter of about 0.5". As will be understood to those skilled in the art, the spiral coil configuration of FIG. 3 could have numerous different configurations dependent on the patterns and dimension of mesh and foil. In other words, the spacing dimension will be adapted to correspond to the trace thickness size and vice versa. Further, the overall coil diameter is a consequence of the number of turns, trace thickness and spacing dimensions selected.

The PCB coil 301 is excited at a selected operation frequency based on the thickness range of coating and the features of conductive foil/mesh (thickness, electrical conductivity, woven pattern, etc.) via electrodes 303 and 305 connected to a function generator or eddy current instrument (e.g., and eddyscope). The coil probe 301 generate the current in the foil mesh, and the instrument (eddyscope) monitors the magnetic field generated by the eddy currents sensed by the receiver coil 310.

The optimum setup parameters (frequency, gain, drive voltage, phased angle) are determined based on the patterns and dimensions of mesh and foil, as well as the interested coating thickness range. For example, for an aggregate coating thicknesses around 0.01" and above, the technician would select an optimum frequency in the range of 0.1-10 MHz. Alternatively, for thicknesses of less than 0.01" the technician can select an optimum frequency in the range of 10 to 100 MHz. In general, the operation frequency can be determined experimentally to achieve the best sensitivity of coating thickness measurement for the interested materials and structures. This generates an electromagnetic field in the conductive layer, and to a lesser extent in the composite material to the extent if the composite material is conductive. The coil impedance is picked up by the secondary sensor via electrodes 304 and 306. The coil impedance is directly related to the thickness of this multi-layer coating system and can be inverted to the wanted coating thickness using established calibration functions or tables, as shown in the Example section below.

An embodiment of the disclosed method comprises the following preliminary steps:

PRELIMINARY STEP (1): The eddy current coil (operating in conjunction with the standard eddy current supporting instrumentation. In some embodiments, the supporting documentation is an eddyscope (e.g., a Uniwest 454 A eddyscope device), is placed on a reference sample which has the same layup and conductive layer as the tested composite panels. The coil is excited by the inspection frequency determined from testing to assure the optimum sensitivity. To calibrate the device, several calibration plastic foils with various thicknesses representing the coating thicknesses of interest are placed between the probe and composite panel, and readings are taken.

PRELIMINARY STEP (2) Next, the thickness of calibrated plastic foil is plotted against the measured coil impedance value using the eddyscope. See, e.g., FIG. 5. The recorded measurement data can be either total coil impedance or output representing lift-off only by changing the phase angle on the eddy current instrument to make conductivity output perpendicular to lift-off output, based on the desired measurement accuracy and inspected coating thickness range, and homogeneity of the tested composite.

PRELIMINARY STEP (3) A calibration function is subsequently generated based on the above measurements. If the calibration function is not created from the measured data, a look-up table or piecewise function will then be generated for coating thickness measurement.

PRELIMINARY STEP (4) The eddy current coil is operated at a lower inspection frequency, e.g., in the range of several hundred kHz dependent on material and geometry of conducting material, to verify the homogeneity of tested composite panel to determine the condition of conductive mesh/foil. If the test shows that the mesh/foil is continuous and uniform, the calibration functions or tables using total coil impedance can be used for coating thickness measurement. If the test reveals conductivity variation between different regions among test panels, the piecewise calibration functions or tables based on lift-off data should be used for coating thickness measurement.

Figure 5:
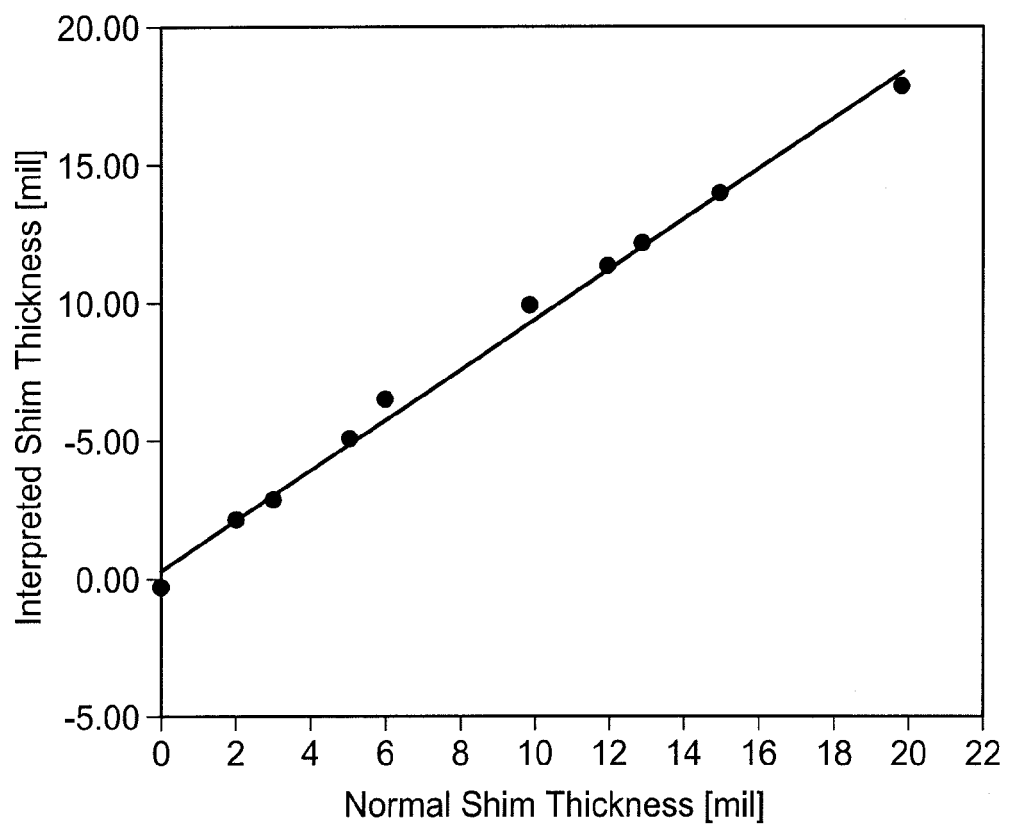
FIG. 5 is a comparison between measured thickness using a two-point calibration function and nominal thickness of plastic foils.

PRELIMINARY STEP (5) Measurement on a coated composite material is performed and the thickness of such coating can be determined using the calibration function/table established in the above step. As shown in FIG. 5, the agreement between the nominal and measured shim thickness is excellent, thereby making this technique suitable for practical application.

Testing Multilayer Coatings

Since the eddy current measurement system (e.g., PCB device 300 along with supporting equipment) senses multi-layer coatings (e.g., layers 206, 208, and 210 in FIG. 2) as one nonconductive coating, the eddy-current measurements are easily interpreted without specialized training to determine total thickness of all the coatings above the metal mesh 204. This makes for more accurate results because the three nonconductive coating layers (e.g., layers 206, 208, and 210) do not have to be individually considered. All that need be determined is the total thickness of the sum of all nonconductive material coatings above the conductive layer. As will be known by those skilled in the art, ultrasonic signals are affected by each layer. This makes the use of ultrasonic measurements much more complex, in that the independent thicknesses of each has to be considered, and errors related to each must be filtered.

Taking eddy current impedance readings by taking advantage of an already existing conductive mesh/foil in a relatively nonconductive composite panel enables a fast, real-time coating thickness measurement without couplant handling issues to ease production and field operation. Also, this eddy current approach could be used for non-contact operations to measure wet or partly cured coatings in conjunction with several known lift-off feedback sensors to reduce production time and cycle. In this sort of embodiment, the feedback sensor, e.g., an optical sensor, can be used to measure the distance between the eddy current probe surface and top surface of the coating system, while the eddy current sensor measures the distance between the probe surface and conducting material. As a result, the sought coating thickness can be determined by simple subtraction.

The use of the PCB eddy-current coil disclosed herein is an improvement over using conventional coil-wound eddy current coil types. First, the PCB fabrication process allows for the depositing of a large diameter coil which is operable at especially high frequencies, in the range of 1-100 MHz. The conventional probes are operable only in the ranges of 100 kHz to 10 MHz and at least three conventional probes are needed to cover this frequency range because of their limited frequency bandwidth. The wider frequency ranges supported using the systems and methods herein, as well as the higher frequency range (from 10-100 MHz) enabled over what is conventional, makes for a more uniform response from the mesh/foil while enhancing accuracy and sensitivity. There are typically conflicting EC probe design parameters for conventional techniques (e.g., the use of small wire wound coil diameters at high inspection frequencies). Second, calibration data can be stored and recalled for measurement since the PCB coil is very reproducible. Minimum calibration is required for different coils of the same geometry, or the calibration quite likely waived in the measurement phase. Third, the PCB coil can be operated in a wide range of frequencies with needed sensitivity and be used for a wide rang of coating thickness measurements. Fourth, the PCB coils are becoming more cost-effective than the hand-wound prior art devices.

Fifth, the PCB board on which the coils are fabricated can be made to be flexible. This flexibility enables the device to be used to measure coating thicknesses for parts having complex contours. And Sixth, the PCB device can be easily integrated with commercial eddy current instrumentation with minimum modifications; thus minimum development cost is needed.

Example

The measurement results presented in this disclosure were obtained using a Uniwest 454 eddy current instrument in conjunction with a 0.3" dia. reflection spiral-wound PCB coil. A multimeter was connected to the horizontal channel of the eddy current instrument to display lift-off voltage readings. Test parameters were as follows:

Frequency: 6.2 MHz
Angle: 120° Gain: 4.1 dB
Filters: 0-100 Hz

First, the probe was placed on an 8-ply carbon composite panel with an intact uniform conductive aluminum (Al) mesh. Then the complex impedance plane was rotated by changing the phase angle so that the lift-off direction appeared horizontal and the vertical component of the impedance variation represented electrical conductivity.

Next, the probe was manually scanned over a 12×12" unpainted composite panel having an Al mesh and it was found that the impedance response was continuous and uniform, as the flying dot (on the Eddy scope) stayed at the null point during scanning.

Then, a series of calibrated plastic foils with different thicknesses (e.g., 4 and 8 mils) were placed between the probe and the composite panel.

After that, the horizontal channel data were recorded and plotted against the nominal foil thickness in Excel. A linear relationship between the measured lift-off data and the plastic foil thicknesses is normally displayed on the eddyscope. In general, the simple linear interpretation technique (1 point or 2 point calibration) cannot provide desirable measurement accuracy over a large measurement range, but the data shows this linear interpolation technique is sufficient over the thickness ranges considered.

The lift-off reading for each plastic foil was inverted to an apparent coating thickness using a two-point linear interpretation technique calibrated on two plastic foils, namely 5.7 mils and 9.9 mils in thickness. FIG. 5 shows a comparison of nominal shim thickness and predicted shim thickness inverted from lift-off reading. A good agreement between the nominal and inverted thicknesses is observed, which shows this technique is able to accurately measure coating thickness on composite panels which include a conductive mesh/foil layer beneath the coatings. It should be mentioned that the discrepancy between nominal and inverted thickness values can be caused by the foil tolerance in addition to inevitable experimental error.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of measuring coating thickness for defects, the method comprising:
providing a composite substrate;
including a conductive layer over a surface of the composite substrate;
depositing a plurality of non-conductive coating layers over the conductive layer;
providing an eddy-current measuring coil formed on a printed circuit board (PCB), the coil having a driving trace having first and second driving electrodes and a receiving trace having first and second receiving electrodes, the receiving and driving traces being either coaxial or interwoven, spaced apart, and sharing a common center;
administering a load in a frequency range from 10 to 100 MHz to the first and second driving electrodes using an eddyscope;
measuring the load across the first and second receiving electrodes to determine impedance; and
using the impedance measured to determine a total thickness for the plurality of coating layers and whether an overall coating thickness is uniform.

2. The method of claim 1 wherein said providing step further comprises: forming the PCB of a flexible material.

3. The method of claim 1 comprising:
using an eddyscope in the measuring step.

4. The method of claim 3 comprising:
using the eddyscope to excite the driving trace, and measuring impedance through a receiving electrode in the coil.

5. The method of claim 1 wherein the first and second traces are spiral.

6. A system for measuring the collective thickness of a non-conductive coating on a composite material, the coating comprising a first layer having a first composition and a second non-conductive layer made of a second composition which is different from the first composition, the system comprising:
an eddyscope;
a PCB mounted eddy-current coil probe electrically connected to the eddyscope, wherein the probe is operable at frequencies between 10 and 100 MHz;
the coil probe being mountable above the first and non-conductive second coating layers and this causing a reading on the eddyscope which is directly related to overall thickness between the coil and a metallic lightning strike discharge layer;
the coil probe further having a driving spiral trace having first and second driving electrodes and a receiving spiral trace having first and second receiving electrodes, the receiving and driving spiral traces being interwoven, equally spaced apart, and sharing a common center.

7. The system of claim 6 wherein the PCB is flexible.

* * * * *